United States Patent
Hattori et al.

(10) Patent No.: US 9,986,358 B2
(45) Date of Patent: May 29, 2018

(54) SOUND APPARATUS, TELEVISION RECEIVER, SPEAKER DEVICE, AUDIO SIGNAL ADJUSTMENT METHOD, AND RECORDING MEDIUM

(71) Applicant: Sharp Kabushiki Kaisha, Sakai, Osaka (JP)

(72) Inventors: Hisao Hattori, Sakai (JP); Junsei Sato, Sakai (JP); Takeaki Suenaga, Sakai (JP); Takuto Ichikawa, Sakai (JP)

(73) Assignee: Sharp Kabushiki Kaisha, Sakai (JP)

(*) Notice: Subject to any disclaimer, the term of this patent is extended or adjusted under 35 U.S.C. 154(b) by 0 days. days.

(21) Appl. No.: 15/319,393

(22) PCT Filed: May 26, 2015

(86) PCT No.: PCT/JP2015/064988
§ 371 (c)(1),
(2) Date: Dec. 16, 2016

(87) PCT Pub. No.: WO2015/194326
PCT Pub. Date: Dec. 23, 2015

(65) Prior Publication Data
US 2017/0142536 A1    May 18, 2017

(30) Foreign Application Priority Data
Jun. 17, 2014    (JP) ................. 2014-124795

(51) Int. Cl.
*H04S 7/00*    (2006.01)
*H04N 5/60*    (2006.01)
*H04S 5/00*    (2006.01)

(52) U.S. Cl.
CPC ............ *H04S 7/301* (2013.01); *H04N 5/607* (2013.01); *H04S 5/005* (2013.01); *H04S 2400/11* (2013.01)

(58) Field of Classification Search
CPC ...... H04S 7/301; H04S 5/005; H04S 2400/11; H04N 5/607
(Continued)

(56) References Cited

U.S. PATENT DOCUMENTS

| | | | | |
|---|---|---|---|---|
| 7,933,421 B2 * | 4/2011 | Asada | ................... | H04S 7/301 381/17 |
| 8,484,190 B1 * | 7/2013 | Igarashi | ............ | G06F 17/30864 707/707 |
| 2013/0324031 A1 * | 12/2013 | Loureiro | ................. | H04S 7/301 455/3.06 |

FOREIGN PATENT DOCUMENTS

| | | |
|---|---|---|
| CN | 101035217 A | 9/2007 |
| JP | 11-113099 A | 4/1999 |
| JP | 11-243599 A | 9/1999 |

OTHER PUBLICATIONS

Official Communication issued in International Patent Application No. PCT/JP2015/064988, dated Aug. 11, 2015.

* cited by examiner

*Primary Examiner* — Melur Ramakrishnaiah
(74) *Attorney, Agent, or Firm* — Keating & Bennett, LLP

(57) ABSTRACT

To prevent the measurement of the position of a speaker from not being performed in a case where the position of the speaker is changed, and prevent the measurement of the position of the speaker from being performed more than necessary. An AV amplifier (1) according to an aspect of the present invention includes: a control unit (105) that detects a change in the installation position of at least one speaker (2) that supplies an audio signal; and a measurement unit (106) that measures the installation position of at least the speaker (2) of which the installation position is changed
(Continued)

among the plurality of speakers (2), automatically or according to a user operation, after the change is detected by the control unit (195).

10 Claims, 7 Drawing Sheets

(58) Field of Classification Search
USPC .............................. 381/304, 77, 82, 307, 384
See application file for complete search history.

SOUND APPARATUS, TELEVISION RECEIVER, SPEAKER DEVICE, AUDIO SIGNAL ADJUSTMENT METHOD, AND RECORDING MEDIUM

TECHNICAL FIELD

The present invention relates to a sound apparatus, a television receiver, and a speaker device that have a surround reproduction function, and an audio signal adjustment method of the sound apparatus. In addition, the present invention relates to a program causing a computer to operate as a sound apparatus, and a recording medium in which the program is recorded.

BACKGROUND ART

In recent years, a sound system that can obtain a high sense of reality by reproducing the audio signal of audio recorded in multi-channels using speakers which are disposed so as to surround the periphery of a user is generally used. Further, a service that distributes the audio of a 5.1-ch system or a 7.1-ch system via recording media, networks, or the like such as broadcast or optical disks is performed. In the sound system including five or seven speakers disposed so as to surround the periphery of the user, the audio signal provided by these systems is also output (reproduced) from the back of the user. Further, a 22.2-ch system that can output audio by a plurality of speakers installed at the upper and the lower of the space where a user exists is also proposed.

In a case where the audio of these systems is reproduced, when a plurality of speakers are disposed as a recommended disposition, an excellent sound effect can be produced and a high sense of reality is reproduced. However, in the 5.1-ch system and the 7.1-ch system, it is recommended that five or seven speakers are disposed at the positions of an equal distance from the user on the plane of the height of the user's ear. Further, in the 22.2-ch system, it is recommended that 22 speakers are disposed at the positions of an equal distance from the user in three-stage heights. As described above, in ordinary homes, it is difficult to achieve the sound system in which a plurality of speakers are disposed, and thus a method that disposes the speakers at the required positions only when needed and puts away the speakers when not in use, is performed.

In order to solve the problems, for example, in PTL 1, a technique that ensures the same effect as the case where the speakers are disposed at the recommended positions by performing adjustment of delay or like that is related to the audio output of the speaker which is installed at a distance from the recommended disposition position, is disclosed.

This technique is a technique that sequentially outputs a test signal from the speakers, receives the test signal by the microphone installed at the position of the user, and changes the delay time, the level, and the like of the audio signal supplied to each speaker based on the result. This technique allows the user to enjoy surround sounds even when using the speaker which is installed at a distance from the recommended disposition position.

CITATION LIST

Patent Literature

PTL 1: Japanese Unexamined Patent Application Publication No. 11-243599 (published on Sep. 7, 1999)

SUMMARY OF INVENTION

Technical Problem

However, in the technique described in PTL 1, although it is necessary to measure the position of the speaker every time the position of the speaker is changed, there is a possibility that the measurement of the position of the speaker is not performed in a case where the position of the speaker is changed by a third party, in spite of the fact that there is a need for the re-measurement of the position of the speaker. In a case where the re-measurement of the position of the speaker is not performed, in spite of the fact that there is a need for the re-measurement of the position of the speaker, the audio is output from each speaker by an inappropriate configuration, and thus the sound system cannot exhibits sufficient effects.

With respect to the problems, it is also considered that the measurement of the position of the speaker is performed each time the sound system is used or every time a predetermined period of time is elapsed. However, even though the position of the speaker is not moved, there is a case where the measurement is performed. Thus, the measurements are performed more than necessary, thereby significantly decreasing convenience of the user.

The present invention has been made to solve the above-described problems, and a main object thereof is to provide a sound apparatus that prevents the measurement of the position of a speaker from not being performed in a case where the position of the speaker is changed, and that prevents the measurement of the position of the speaker from being performed more than necessary.

Solution to Problem

In order to solve the above-described problems, according to an aspect of the present invention, there is provided a sound apparatus that supplies an audio signal to each of a plurality of speakers, including: a detection unit that detects a change in the installation position of at least one speaker; a measurement unit that measures the installation position of at least the speaker of which the installation position is changed among the plurality of speakers, automatically or according to a user operation, after the change is detected by the detection unit; and an adjustment unit that adjusts the audio signal based on the measurement result of the measurement unit.

According to an aspect of the present invention, there is provided a speaker device that outputs the audio indicated by an audio signal when the audio signal is supplied from a sound apparatus. Preferably, the speaker device includes an output unit that outputs information for causing the sound apparatus to detect a change in the position of the speaker device, toward the sound apparatus, in a case where the position of the speaker device is changed.

According to an aspect of the present invention, there is provided an audio signal adjustment method performed by a sound apparatus that supplies an audio signal to each of a plurality of speakers, including: a detection step for detecting a change in the installation position of at least one speaker; a measurement step for measuring the installation position of each of the plurality of speakers, automatically or according to a user operation, after the change is detected by the detection step; and an adjustment step for adjusting the audio signal based on the measurement result in the measurement step.

Advantageous Effects of Invention

According to an aspect of the present invention, it is possible to realize a sound apparatus that can prevent the measurement of the position of the speaker from not being performed in a case where the position of the speaker is changed, and prevent the measurement of the position of the speaker from being performed more than necessary.

DESCRIPTION OF EMBODIMENTS

<First Embodiment>

Hereinafter, an embodiment of the present invention will be described in detail. Here, the configuration described in this embodiment is not intended to limit the scope of the present invention and is only an illustrative example unless a specific description is particularly noted.

[Configuration of Sound System]

Figure 1:
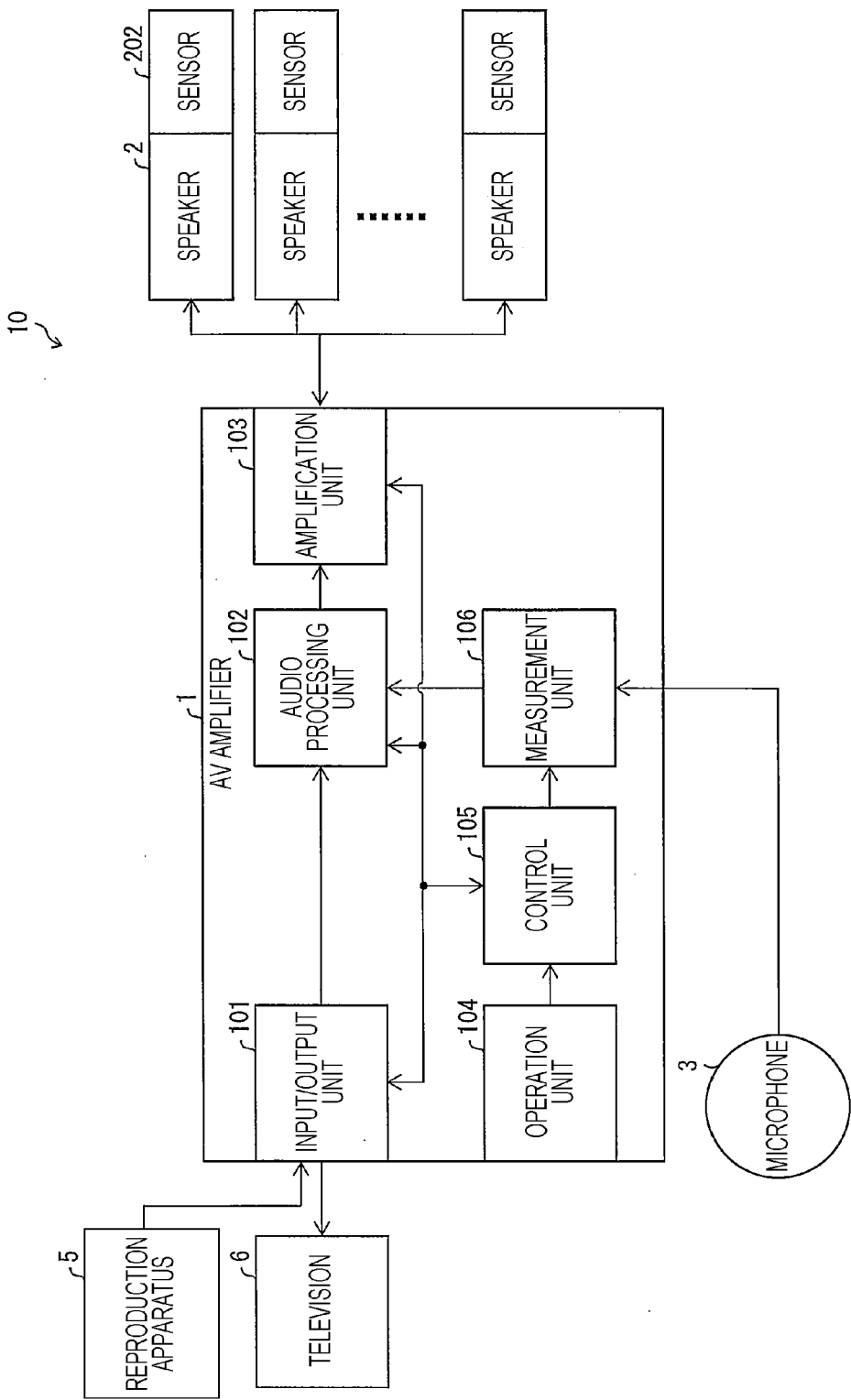
FIG. 1 is a block diagram illustrating an outline of the configuration of a sound system according to an embodiment of the present invention.

First, an outline of the configuration of a sound system 10 according to the present embodiment will be described with reference to FIG. 1. FIG. 1 is a block diagram illustrating an outline of the configuration of the sound system 10 according to the present embodiment. As illustrated in FIG. 1, the sound system 10 according to the present embodiment includes an AV amplifier 1 (a sound apparatus), speakers 2 (speaker devices), a microphone 3, a reproduction apparatus 5, and a television 6.

As illustrated in FIG. 1, the AV amplifier 1 is respectively connected to a plurality of speakers 2, the microphone 3, the reproduction apparatus 5, and the television 6. The speaker 2 incorporates a sensor 202. The sensor 202 included in the speaker 2 detects the movement of the speaker 2, and may be, for example, an acceleration sensor or a pressure switch provided at the bottom portion of the speaker as an example.

The microphone 3 incorporates a plurality of microphone units (to be described later with reference to FIG. 2). As the reproduction apparatus 5, for example, a BD player, a DVD player, or the like is included.

(Configuration of AV Amplifier)

Next, the configuration of the AV amplifier 1 according to the present embodiment will be described. The AV amplifier 1 functions as the sound apparatus that supplies an audio signal to each of the plurality of speakers 2. As illustrated in FIG. 1, the AV amplifier 1 includes an input/output unit 101, an audio processing unit 102 (adjustment unit), an amplification unit 103, an operation unit 104, a control unit 105 (detection unit), and a measurement unit 106 (detection unit).

The input/output unit 101 is connected to the reproduction apparatus 5 and the television 6. The AV amplifier 1 may be connected to the reproduction apparatus 5 and the television 6, for example, by wired connection using a HDMI cable or the like, or wireless connection, and the connection is not particularly limited.

The input/output unit 101 receives an input of a reproduction signal indicating the content reproduced in the reproduction apparatus 5, and outputs the input signal to the television 6. In the present embodiment, the reproduction signal includes a video signal indicating the video of the content reproduced in the reproduction apparatus 5, and an audio signal indicating the audio of the content. At this time, among the signals included in the reproduction signal, the video signal is supplied to the television 6 via the input/output unit 101 from the reproduction apparatus 5. The input/output unit 101 may also have a function of superimposing text information or an image on the video information to be output to the television 6.

The audio signal included in the reproduction signal is input into the AV amplifier 1 via the input/output unit 101. The audio signals that are input into the AV amplifier 1 are decoded and treated as audio signals of a plurality of channels. The audio signals of the plurality of channels that are decoded are input to the audio processing unit 102.

The audio processing unit 102 performs adjustment processing of adjusting the delay time, the level, and the frequency characteristics of the audio signals of the plurality of channels that are decoded, and outputs the adjusted audio signals to the amplification unit 103. The audio processing unit 102 further adjusts the audio signals based on the measurement result of the measurement unit 106 to be described later.

At this time, the audio processing unit 102 may down-mix or up-convert the audio signals depending on the number of speakers 2 connected to the AV amplifier 1. In other words, the audio processing unit 102 may delay the audio signals of the plurality of channels as necessary, and mix the delayed audio signals in a proper proportion, and output the mixed audio signals to the speaker 2. Alternatively, the audio processing unit 102 may analyze the relationship between the audio signals of the plurality of channels, and newly generate audio signals obtained by interpolating the audio signals of the plurality of channels, and output the interpolated audio signals to the speaker 2.

The amplification unit 103 drives the speaker 2 by amplifying the audio signals of the plurality of channels that are supplied from the audio processing unit 102, and acquires the output signal of the sensor 202 that is sent from the speaker 2 (sensor signal).

In the present embodiment, the AV amplifier 1 and the speaker 2 are connected to each other by wired connection. Although the AV amplifier 1 and the speaker 2 may be connected to each other using a dedicated line that is used for the transmission of the audio signal and a dedicated line that is used for the transmission of the sensor signal, the sensor signal may be transmitted being superimposed on the line that is used for the transmission of the audio signal. In this case, a method that allocates the frequency band of a high-frequency signal for the transmission (communication) of the sensor signal using a filter may be used.

The operation unit 104 receives an operation of a user, and transmits the operation of the user to the control unit 105. Here, the operation unit 104 may receive the operation of the user via a remote controller.

The control unit 105 integrally controls the processing of the AV amplifier 1. The control unit 105 reflects the operation of the user that is received by the operation unit 104 in the control of each unit.

The control unit 105 detects a change in the installation position of at least one speaker 2 of the plurality of speakers 2. In this embodiment, the control unit 105 detects the movement (change) of the installation position of the speaker 2, based on the sensor signal from the sensor 202 that is acquired by the amplification unit 103. Specifically, the control unit 105 manages the movement of the installation position of the speaker 2 by a movement flag indicating that the installation position of the speaker 2 is moved. In a case where it is detected that the installation position of the speaker 2 is moved, the control unit 105 sets the value of the movement flag, for example, to "1" from "0".

The movement flag may be provided for each of the plurality of speakers 2 (that is, one movement flag may correspond to one speaker 2), or one movement flag may correspond to the plurality of speakers 2. The movement flag is not particularly limited.

After the control unit 105 detects the change in the position of the speaker 2, the measurement unit 106 measures the new installation position of each of the plurality of speakers 2 (or only the speaker 2 of which the installation position is changed), automatically or according to the operation of the user (instruction of the user). At this time, prior to the measurement, the microphone 3 is placed at the viewing position (position of the user when the user uses the sound system 10) by the user.

The measurement unit 106 receives sound reception signals that are input from the connected microphone 3, and analyzes the installation position, the audio level, and the frequency characteristics, and the like of the speaker 2 that is connected to the AV amplifier 1, from the received sound reception signals. More specifically, the measurement unit 106 receives the sound reception signals from each of the plurality of microphone units 301 incorporated in the microphone 3, and analyzes each of the received sound reception signals. The measurement unit 106 measures the installation position of the speaker 2 from the analysis result. The position of the microphone 3 can be calculated, for example, from the known position of the speaker 2 such as the speaker 2 that is not moved. Therefore, in a case where the position of the speaker 2 of which the position is not changed is also measured, the user may not accurately return the position of the microphone 3 to the viewing position at which the microphone is placed at the previous measurement.

The measurement unit 106 transmits the analysis result to the audio processing unit 102 such that the analysis result is reflected in the adjustment processing in the audio processing unit 102.

(Configuration of Microphone)

The configuration of the microphone 3 according to the present embodiment will be described with reference to FIG. 2. FIG. 2 is a diagram schematically illustrating the configuration of the microphone 3 according to the present embodiment. FIG. 2(a) is a perspective view of the microphone unit 301 included in the microphone 3, FIG. 2(b) is a front view (a view when viewed from the positive X-axis direction) of the microphone unit 301, FIG. 2(c) is a top view (a view when viewed from positive Z-axis direction) of the microphone unit 301, and FIG. 2(d) is a right side view (a view when viewed from negative Y-axis direction).

Figure 2:
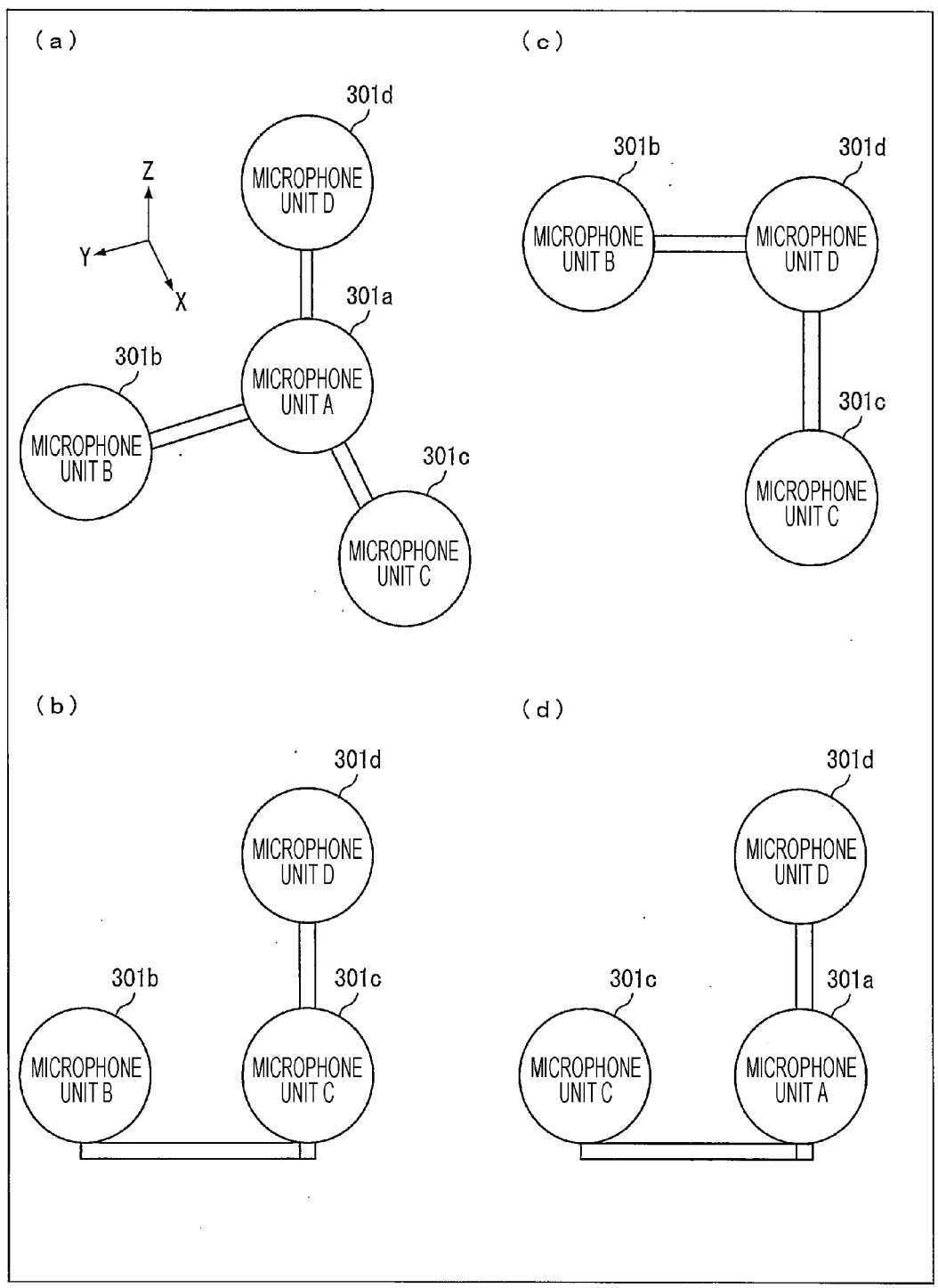
FIG. 2 is diagram schematically illustrating the configuration of a microphone according to an embodiment of the present invention.

As illustrated in FIG. 2, the microphone 3 includes the plurality of microphone units 301a to 301d (in the present embodiment, four microphone units). The microphone units 301a to 301d are disposed so as to spatially be dispersed (that is, such that at least one microphone unit 301 and other microphone units 301 are not positioned on the same plane). In the present embodiment, the microphone units 301a to 301d are disposed so as to form a three-dimensional (three-axis) orthogonal coordinate system around the microphone units 301a.

More specifically, as illustrated in FIGS. 2(a) to 2(d), the position of the microphone unit 301a is set as the original point, the microphone unit 301b is positioned on the positive Y-axis, the microphone unit 301c is positioned on the positive X-axis, and the microphone unit 301d is positioned on the positive Z-axis, respectively. The microphone units 301a to 301d are disposed such that the distances between the microphone unit 301a and each of the microphone units 301b to 30d are all the same.

The disposition relationship between the microphone units 301a to 301d is not limited thereto. The number of the microphone units 301 is not limited thereto, and there is no problem as long as there is a plurality of microphone units.

[Processing of Sound System]

Figure 3:
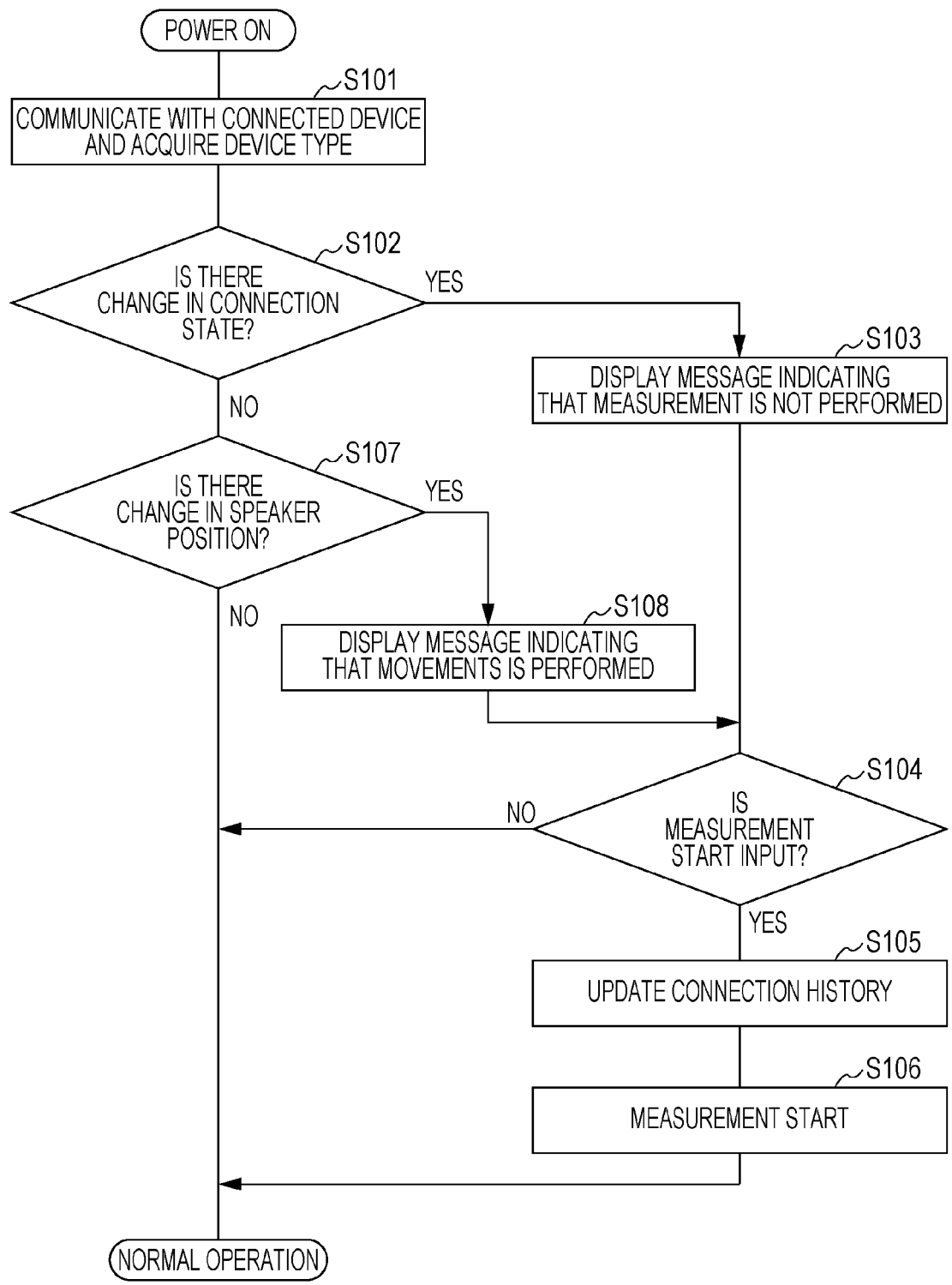
FIG. 3 is a flowchart illustrating a flow of processing in the sound system according to an embodiment of the present invention.

Next, the processing (operation) of the entire sound system 10 will be described with reference to FIG. 3. FIG. 3 is a flowchart illustrating a flow of the processing in the sound system 10 according to the present embodiment.

First, the speaker 2, the microphone 3, the reproduction apparatus 5, and the television 6 are connected to the AV amplifier 1, and power is supplied to each of these apparatuses by the user (hereinafter, also referred to as power ON). When power is ON, the control unit 105 of the AV amplifier 1 communicates with the speaker 2, the reproduction apparatus 5, and the television 6 that are connected, via the input/output unit 101 and the amplification unit 103, and acquires the type of the connected device by acquiring ID or the like for identifying each device (step S101).

When the type of the connected device is acquired, the control unit 105 extracts the connection history of each device that is held in a storage unit (not illustrated) of the AV amplifier 1 or the like. In the connection history, the connection state between the AV amplifier 1 and each device (that is, which device is connected to the AV amplifier 1) when the power of the AV amplifier 1 is ON at the previous time (hereinafter, also simply referred to as a "previous connection state") is read. The control unit 105 determines whether or not there is a change from the previous connection state to the current connection state (step S102), by comparing the previous connection state recorded in the extracted connection history and the current connection state indicated by the type of the connected device that is acquired in step S101.

When it is determined that there is a change in the connection state (YES in step S102), the control unit 105 displays a message of "Measurement is not performed. Start to perform measurement?" or the like on the screen of the television 6 via the input/output unit 101 (step S103).

When the message is displayed, the control unit 105 determines whether or not an instruction of the user for instructing the AV amplifier 1 to start the measurement of the installation position of the speaker 2 (a speaker position measurement start instruction) is input (step S104). The instruction of the user for instructing the speaker position measurement start may be received, for example, via a remote controller.

When the speaker position measurement start instruction is input (YES in step S104), the control unit 105 updates the previous connection state recorded in the connection history to the current connection state (step S105), and starts the speaker position measurement processing (step S106). The speaker position measurement processing will be described later. In the present embodiment, although a case where the control unit 105 executes step S105 and step S106 in this order will be described, the execution order is not limited thereto, a configuration in which the processing of step S105 is executed after executing the processing of step S106 may be also employed.

The AV amplifier 1 sequentially measures the installation positions of the speakers 2. After measuring the installation positions of all of the speakers 2, the AV amplifier 1 can reflect the measurement result acquired by the measurement unit 106 in the adjustment processing of the audio signal in the audio processing unit 102. Accordingly, the AV amplifier 1 can provide a good audio reproduction environment (sound field) to the user. As the result of the measurement, in a case where a speaker without any response or a speaker of which characteristics are totally different from those of other speakers is detected, the AV amplifier 1 may stop the use of the speaker. Accordingly, the AV amplifier 1 can prevent necessary audio signals from not being output from the speaker 2 due to the allocation of the signals to such a speaker.

When it is determined that there is no change in the connection state (NO in step S102), the control unit 105 detects a change in the installation position of the speaker 2 by further determining whether or not there is a change in the installation position of the speaker 2 with respect to the AV amplifier 1 (step S107). The control unit 105 may determine whether or not there is a change in the installation position of the speaker 2 with respect to the AV amplifier 1, by referring to the value of the movement flag associated with each speaker 2. For example, the control unit 105 may determine that the installation position of the speaker 2 corresponding to the movement flag of which value is set to "1" is changed, and determine that the installation position of the speaker 2 corresponding to the movement flag of which value is set to "0" is not changed.

In a case where the installation position of the speaker 2 is changed (YES in step S107), it is necessary to measure the current installation position of the speaker 2, and thus the control unit 105 displays a message such as "Speaker is moved. Start to perform re-measurement?" or the like that requests to start the measurement of the installation position of the speaker, on the screen of the television 6 (step S108).

When the message is displayed on the display unit of the television 6, the control unit 105 executes the processing of step S104 to step S106.

In a case where the speaker position measurement start instruction is not input after the message is displayed (NO in step S104), after the speaker position measurement processing (step S106) is executed, or in a case where there is no change in the installation position of the speaker 2 (NO in step S107), the sound system 10 performs a normal operation.

As described above, the movement flag may correspond to each of the plurality of speakers 2, or one movement flag may correspond to the plurality of speakers 2. In a case where the movement flag corresponds to each of the plurality of speakers 2, the control unit 105 can shorten the time required for the processing by performing the speaker position measurement processing for only the speaker 2 corresponding to the movement flag of which the value is set to "1".

As described above, the AV amplifier 1 updates the installation position of the speaker 2 by measuring the current installation position of the speaker 2 of which the installation position is changed, and reflects the measurement result in the adjustment processing of the audio signal in the audio processing unit 102. Thus, it is possible to maintain a good audio reproduction environment.

(Processing of Sound System When Power is OFF)

When the use of the sound system 10 is completed, the power of the sound system 10 is turned off by the user with the speaker 2, the microphone 3, the reproduction apparatus 5, the television 6, and the like connected to the AV amplifier 1 (hereinafter, also referred to as power OFF). At this time, the control unit 105 and the operation unit 104 of the AV amplifier 1 wait for the operation of the user with some functions of the AV amplifier 1 activated (that is, a stand-by mode). The control unit 105 continues to communicate with the sensor 202 incorporated in the speaker 2 via the amplification unit 103. In the present embodiment, when the power of the sound system 10 is turned off, the power of other devices included in the sound system 10 is turned OFF, for example, in conjunction with the power OFF of the AV amplifier 1, the television 6, or the like. However, of course, the power of each device may be turned OFF independently.

When the sensor 202 detects the movement of the speaker 2, the sensor 202 notifies the control unit 105 of a sensor signal indicating that the installation position of the speaker 2 is moved. When the sensor signal is acquired from the sensor 202 of the speaker 2, the control unit 105 records the movement of the installation position of the speaker 2 by setting the value of the movement flag corresponding to the moved speaker 2 to "1" from "0".

During a period for which the AV amplifier 1 is not activated (power is OFF), the sensor 202 of the speaker 2 may detect the presence or absence of the movement of the speaker 2, and record the detection result in a recording unit or the like of the speaker 2 (not illustrated) (for example, in a case where the movement of the speaker 2 is detected, the value of the movement flag of the recording unit may be set to "1" from "0"). In this case, when the AV amplifier 1 is activated, in order to detect a change in the installation position of the speaker 2, the measurement unit 106 of the AV amplifier 1 may check the presence or absence of the movement of the speaker 2.

According to the configuration, even in a case where the installation position of the speaker 2 is moved while the power of the sound system 10 is OFF, when the user operates the operation unit 104 such that the power of the sound system 10 is ON, the control unit 105 can detect (check) that the speaker 2 is moved by referring to the movement flag. In a case where it is checked that the installation position of the speaker 2 is not moved by referring to the movement flag (in a case where a change in the installation position of the speaker 2 is not detected), the control unit 105 transitions to the normal operation.

As described above, while the power is OFF, whether the installation position of the speaker is moved is detected and recorded, the installation position of the speaker with respect to the AV amplifier 1 being a measurement object, and thus the number of the measurements when the power is ON is minimized. Therefore, it is possible to maintain a good audio reproduction environment while reducing the stress imposed on the user.

(Speaker Position Measurement Processing)

Next, the speaker position measurement processing in the sound system 10 will be described.

The microphone 3 is disposed by the user who is requested to measure the position of the speaker 2 by the message displayed on the television 6 in step S103 or step S108 illustrated in FIG. 2, at the position when the user views the television 6 (hereinafter, also referred to as a viewing position). The user notifies the AV amplifier 1 of the speaker position measurement start instruction using a remote control, and thus the measurement of the installation position of the speaker 2 in the sound system 10 is started.

When the speaker position measurement start instruction is received from the user, the AV amplifier 1 of the AV amplifier 1 sequentially outputs a measurement audio signal from the measurement unit 106 to each of the plurality of speakers 2 via the audio processing unit 102 and the amplification unit 103. When the measurement audio signal is received, each speaker 2 outputs the measurement audio representing the received measurement audio signal. The sound of the measurement audio that is output from one speaker 2 among the speakers 2 is received by the microphone 3, and the received sound is input to the measurement unit 106 of the AV amplifier 1 as the sound reception signal. The measurement unit 106 acquires the position, the audio level, the frequency characteristics, and the like of the speaker by analyzing the sound reception signal that is input, and supplies the acquired analysis result to the audio processing unit 102. The audio processing unit 102 sets the adjustment value and the like in the adjustment processing (delay time, level, and frequency characteristics, and the like) to be performed on the audio signals of the plurality of channels, based on the supplied analysis result.

The information that can be acquired through the microphone 3 and the information that is obtained as the analysis result are changed by the measurement audio signal that is used as the measurement audio. For example, white noise is used as the measurement audio, and thus the measurement unit 106 can acquire the delay time of the speaker by detecting the rise of the sound reception signal from the microphone 3, and acquire the frequency characteristics of the speaker by analyzing the frequency characteristics of the sound reception signal.

A time-stretched pulse or an M-sequence signal is used as the measurement audio, and thus it is possible to calculate an impulse response from the sound reception signal. Since the impulse response indicates a response as a system, it is possible to obtain various analysis results such as a delay time, phase characteristics, frequency characteristics, or the like from the impulse response. Thus, it is possible to use the various analysis results in the setting (correction) of the adjustment value of the adjustment processing in the audio processing unit 102. Here, the delay time in the present embodiment refers to the propagation time of a sound wave during a period for which the sound wave is radiated (output) from the speaker 2 and propagated to the microphone 3. The measurement unit 106 can recognize the distance between the speaker 2 and the microphone 3 by multiplying the delay time by the sound speed. In a case where a delay time due to another factor other than the time for which a sound is propagated through a space is considered in the delay time, it is preferable that the addition of the delay time due to another factor is considered in advance. Since the sound speed is changed depending on the temperature, it is preferable to correct the sound speed by providing a temperature sensor.

Further, the measurement unit 106 analyzes each signal from the plurality of microphone units 301 incorporated in the microphone 3, and calculates the delay time of each signal. As described above, the microphone units 301 are disposed so as to be spatially distributed, and thus it is possible to calculate the distance between each of the microphone units 301 and the speaker 2. Therefore, the measurement unit 106 can calculate the relative position of the speaker 2 with respect to the microphone 3, and thus calculate the installation position of the speaker 2. In this way, in the present embodiment, the measurement unit 106 can measure the installation position of the speaker 2 by calculating the relative position of the speaker 2 with respect to the microphone 3.

In the above description, in a case where the speaker position measurement start instruction by the user is received in S104 illustrated in FIG. 3, a case where the speaker position measurement processing is executed is described as an example. However, the present embodiment is not limited thereto. For example, in a case where it is determined that there is a change in the connection state in step S102 illustrated in FIG. 3 (YES in S102), without displaying a message on the television 6, the speaker position measurement processing may be automatically executed. In this case, it is preferable that the microphone 3 is placed in advance at the position at which the user views the television 6 or in the vicinity of the position.

As described above, in a case where the change in the installation position of the speaker 2 is detected by the control unit 105, the AV amplifier 1 can measure the installation position of the speaker 2 by the measurement unit 106. Accordingly, the AV amplifier 1 can prevent the measurement of the installation position of the speaker 2 from not being performed in a case where the installation position of the speaker 2 is changed. On the other hand, the AV amplifier 1 does not perform the measurement of the installation position of the speaker 2 in a case where the installation position of the speaker 2 is not changed. Therefore, the AV amplifier 1 can prevent the measurement of the position of the speaker 2 from not being performed in a case where the position of the speaker 2 is changed, and prevent the measurement of the position of the speaker 2 from being performed more than necessary.

As described above, in the measurement of the position of the speaker 2, it is necessary to reproduce the measurement audio signal, and it also takes some time for the measurement. Thus, as in the related art, when the measurement of the position of the speaker 2 is required more than necessary, this causes a stress on the user. In addition, at the time of the measurement of the position of the speaker 2, there are many restrictions on the operation of the user, such as the user should reproduce the measurement audio, the user cannot reproduce a desired audio during the measurement, it is necessary that the user tries not to make any noise as soon as possible in order to obtain a good measurement result, or the like. However, as described above, the AV amplifier 1 can prevent the measurement of the position of the speaker 2 from being performed more than necessary, and thus it is possible to reduce the stress on the user.

<Second Embodiment>

Figure 4:
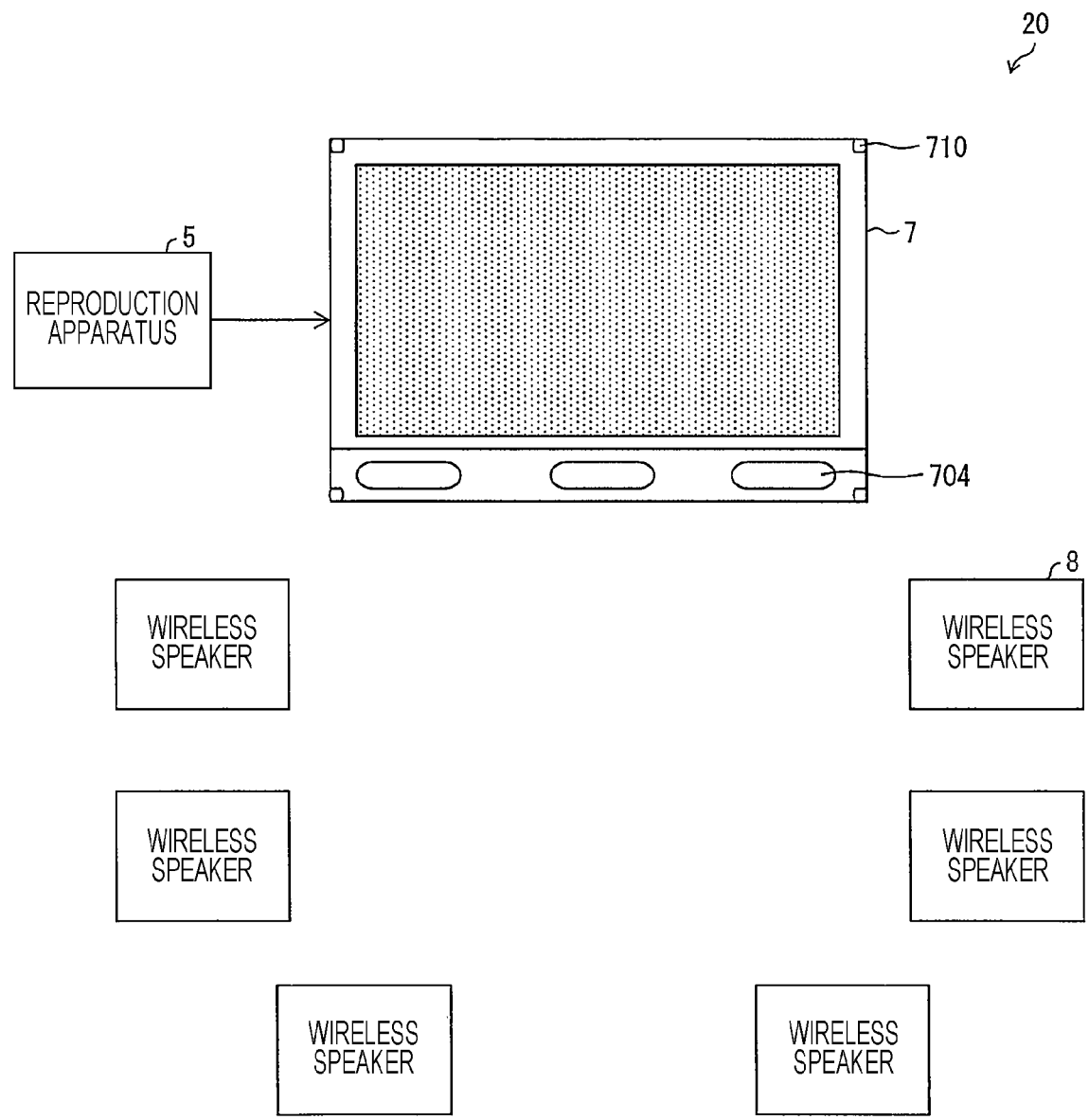
FIG. 4 is an external view schematically illustrating an outline of the configuration of a sound system according to another embodiment of the present invention.

Next, another embodiment of the present invention will be described with reference to FIGS. 4 to 7. FIG. 4 is an external view schematically illustrating an outline of the configuration of a sound system 20 of the present embodiment. As illustrated in FIG. 4, the sound system 20 according to the present embodiment includes a reproduction apparatus 5, a television 7 (sound apparatus, television receiver), and a plurality of wireless speakers 8 (speaker devices).

The television 7 is connected to the reproduction apparatus 5 by wired connection using a HDMI cable or the like. In addition, the television 7 is connected to the wireless speakers 8 by wireless connection. As illustrated in FIG. 4, the television 7 incorporates speakers 704 and microphones 710.

(Configuration of Television)

Figure 5:
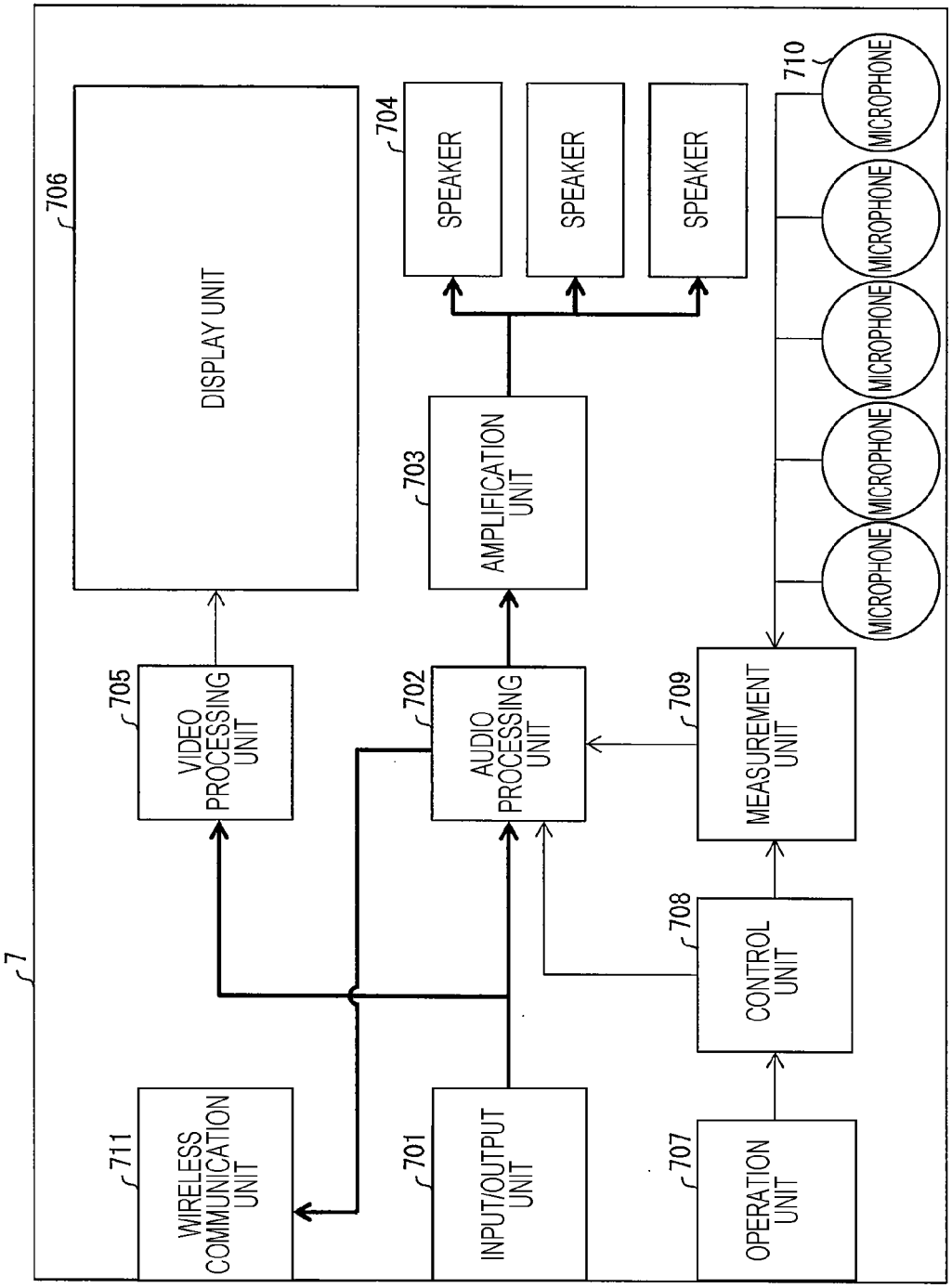
FIG. 5 is a block diagram illustrating an outline of the configuration of a television according to another embodiment of the present invention.

The configuration of the television 7 according to the present embodiment will be described with reference to FIG. 5. FIG. 5 is a block diagram illustrating an outline of the configuration of the television 7 according to the present embodiment.

The television 7 according to the present embodiment functions as a sound apparatus that supplies an audio signal to each of the plurality of speakers 2. As illustrated in FIG. 5, the television 7 includes an input/output unit 701, an audio processing unit 702 (adjustment unit), an amplification unit 703, a plurality of speakers 704, a video processing unit 705, a display unit 706, an operation unit 707, a control unit 708 (detection unit), a measurement unit 709 (measurement unit), a plurality of microphones 710, and a wireless communication unit 711.

In the input/output unit 701, a tuner, external connection terminals (both not illustrated), and the like are provided, and an antenna, an external device, and the like are connected to the input/output unit 701. The input/output unit 701 and the external device are connected to each other by, for example, HDMI (registered trademark). The broadcast wave received by the tuner of the input/output unit 701 is decoded and divided into a video signal and an audio signal. Similarly, the input signal that is input from the external device connected to the external connection terminal of the input/output unit 701 is divided into a video signal and an audio signal. The video signal divided in the input/output unit 701 is supplied to the video processing unit 705, and the audio signal divided in the input/output unit 701 is supplied to the audio processing unit 702.

The video processing unit 705 adjusts the video signal supplied from the input/output unit 701, and supplies the adjusted video signal to the display unit 706. In addition, the video processing unit 705 superimposes character information, control information, and the like on the video signal by the control of the control unit 708, and supplies the superimposed video signal to the display unit 706.

The display unit 706 displays the video represented by the video signal supplied from the video processing unit 705. The display panel included in the display unit 706 may be, for example, a liquid crystal panel, a plasma display panel, an organic EL panel, a cathode-ray tube, or the like, and is not particularly limited.

The audio processing unit 702 processes the audio signal supplied from the input/output unit 701. Specifically, the audio processing unit 702 expands the audio signal into audio signals of a plurality of channels by decoding the audio signal such as a 5.1-ch signal, a 22.2-ch signal, or the like, and the audio signal that is encoded in a different format, among the audio signals supplied from the input/output unit 701. For example, the audio processing unit 702 expands the 5.1-ch signal that is propagated by the broadcast wave into signals of 5.1-ch components, and treats the expanded signals as the audio signals of the plurality of channels. The same is true as for the 22.2-ch signal.

The audio processing unit 702 further performs the adjustment processing of adjusting the delay time, the level, the frequency characteristics, or the like of each of the expanded audio signals of the plurality of channels, and outputs each of the audio signals of the plurality of channels that is subjected to the adjustment processing to the amplification unit 703. The audio processing unit 702 further adjusts the audio signals based on the measurement result of the measurement unit 709 to be described.

The amplification unit 703 respectively amplifies the audio signals of the plurality of channels that are supplied from the audio processing unit 702, and outputs the amplified audio signals to the speakers 704.

The speakers 704 output the audio that is to be output from the front of the user (from the front of the user who views the television 7). For example, the three speakers 704 are configured to output the audio represented by the audio signals of three channels to be output from the front of the user (audio signals of a left (L) channel, a center (C) channel, and a right (R) channel), among the audio signals of the 5.1ch signal. Thus, the speakers 704 can output the audio represented by the audio signals of three channels to be output from the front of the user, among the audio signals of the 5.1ch signal.

The operation unit 707 receives the operation of the user, and notifies the control unit 708 of the operation of the user that is received. Here, the operation unit 707 may receive the operation of the user via a remote controller.

The control unit 708 reflects the operation of the user that is received by the operation unit 707 in the control of each unit. The control unit 708 detects a change in the installation position of at least one wireless speaker 8 among the plurality of wireless speakers 8.

After the control unit 708 detects the change in the position of the wireless speaker 8, the measurement unit 709 measures the installation position of each of the plurality of wireless speakers 8 (or only the wireless speaker 8 of which the position is changed), automatically or according to the operation of the user (user instruction). At this time, the measurement unit 709 receives a sound reception signal indicating the audio acquired in the microphones 710, and analyzes the position, the frequency characteristics, and the like of the wireless speaker 8 that is connected by wireless connection. The measurement unit 709 transmits the analysis result obtained by the analysis to the audio processing unit 702, and reflects the analysis result in the adjustment processing (the processing of adjusting the delay time, the level, the frequency characteristics, and the like of the audio signal) to be performed in the audio processing unit 702.

The microphone 710 is mounted toward the outside of the television 7, receives the sound of the measurement audio that is output from the wireless speaker, and supplies the received sound to the measurement unit 709. In the disposition of the plurality of microphones 710, similar to the disposition of the microphone units 301 described in the first embodiment, it is preferable that four or more microphones 710 are disposed such that at least one microphone 710 and other microphones 710 are not positioned on the same plane. In the present embodiment, the microphones 710 are disposed at five locations in total of the four corners and the back of the television 7.

The microphones 710 are incorporated in the television 7, and thus it is possible to maintain substantially constant the relative positions of the microphones 710 with respect to the television 7 in the sound system 20. The installation position of the television 7 is usually unlikely to be moved, and thus it is possible to more accurately maintain the relative position between the microphone 710 and each of the wireless speakers 8. Accordingly, the television 7 measures the moved installation position of only the wireless speaker 8 that is moved and reflects only the measurement result in the adjustment processing of the audio signal in the audio processing unit 702. Therefore, it is possible to update the disposition of the entire sound system 20 and provide a good audio reproduction environment.

The user enjoys the audio output from the speakers 704 while viewing the video displayed on the display unit 706 of the television 7. Thus, the television 7 can recognize the reproduction environment by recognizing the relative position of the speaker 704 with respect to the television 7. In a case where the installation position of the television 7 is moved, the sound system 20 may perform the measurement of the entire sound system 20 based on the operation of the user, or automatically perform the measurement of the entire sound system 20 when the movement of the television 7 is detected by the sensor incorporated in the television 7.

The wireless communication unit 711 performs wireless communication with the wireless speakers 8.

(Configuration of Wireless Speaker)

Figure 6:
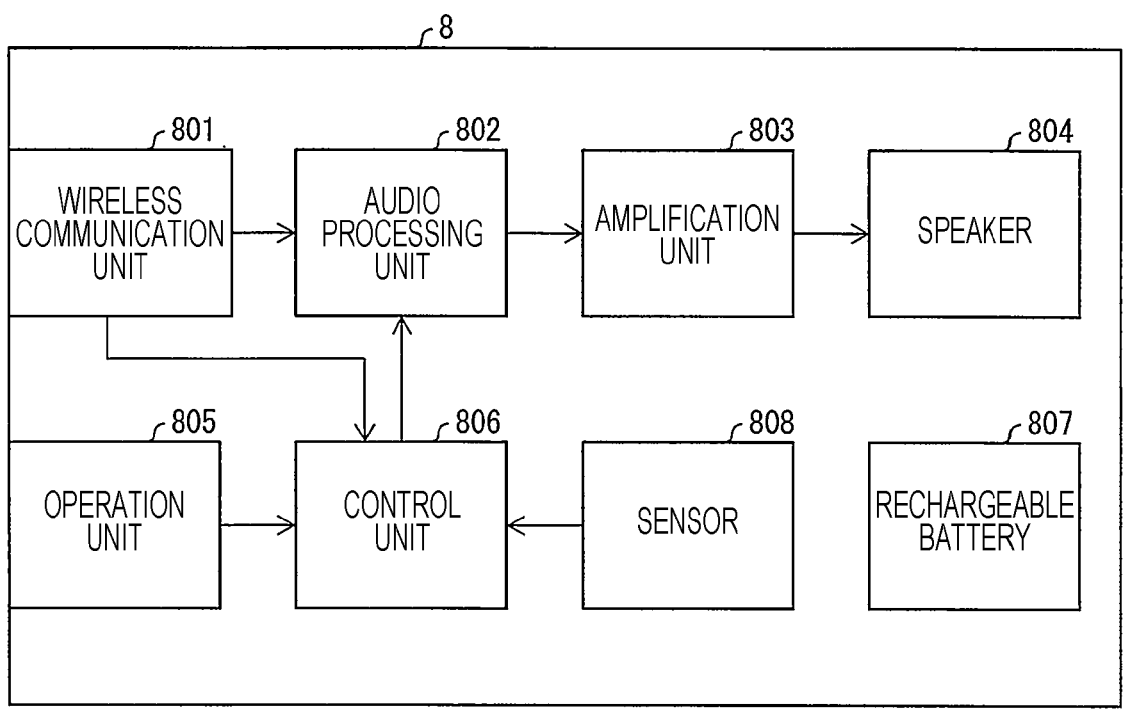
FIG. 6 is a block diagram illustrating an outline of the configuration of a wireless speaker according to another embodiment of the present invention.

Next, the configuration of the wireless speaker 8 according to the present embodiment will be described with reference to FIG. 6. FIG. 6 is a block diagram illustrating an outline of the configuration of the wireless speaker 8 according to the present embodiment.

As illustrated in FIG. 6, the wireless speaker 8 includes a wireless communication unit 801, an audio processing unit 802, an amplification unit 803, a speaker 804, an operation unit 805, a control unit 806, a rechargeable battery 807, and a sensor 808.

The wireless communication unit 801 communicates with the television 7 by wireless communication, receives the audio signal from the television 7, and outputs the received audio signal to the audio processing unit 802. The wireless communication unit 801 transmits the power state of the wireless speaker 8, a control signal such as output level adjustment or the like, the charging status of the rechargeable battery 807, error information of each unit, and the like, to the television 7.

The audio processing unit 802 processes the audio signal received by the wireless communication unit 801, and supplies the audio signal to the amplification unit 803. The contents of the processing on the audio signal in the audio processing unit 802 may include, for example, level adjustment, frequency characteristics adjustment, and the like.

The amplification unit 803 amplifies the audio signal supplied from the audio processing unit 802, and drives the speaker 804 so as to output the audio represented by the audio signal.

The speaker 804 outputs the audio. The speaker 804 may be configured by a plurality of speaker units. In other words, in the speaker 804, a plurality of speakers having the same type may be connected to each other, or a plurality of speakers having a different reproduction band may be connected to each other.

The operation unit 805 receives the operation of the user. Specifically, the operation unit 805 receives the operation of the user such as power ON, power OFF, a pairing operation of the wireless communication, or the like.

The control unit 806 controls each unit of the wireless speaker 8, based on the control signal from the television 7 that is received by the wireless communication unit 801, and the operation of the user that is received by the operation unit 805. The control unit 806 monitors the output (sensor signal) from the sensor 808, and monitors (detects) whether the installation position of the wireless speaker 8 is moved. The detection of the movement of the installation position of the wireless speaker 8 can be managed by the movement flag, similar to the detection by the control unit 105 included in the AV amplifier 1 according to the first embodiment, and thus the detailed description thereof is omitted here.

The rechargeable battery 807 is a rechargeable battery serving as an operating power supply of the wireless speaker 8. The rechargeable battery 807 appropriately supplies the power charged in the rechargeable battery 807 to each unit of the wireless speaker 8.

The sensor 808 is a sensor that detects whether the wireless speaker 8 is moved. The sensor 808 may be, for example, a switch that detects whether the wireless speaker is placed on the floor, or an acceleration sensor, and is not particularly limited. In a case where an acceleration sensor is used as the sensor 808, even when the wireless speaker 8 is moved in such a way in which the wireless speaker is dragged on the floor, the movement of the wireless speaker can be also detected reliably.

[Processing of Sound System]

Figure 7:
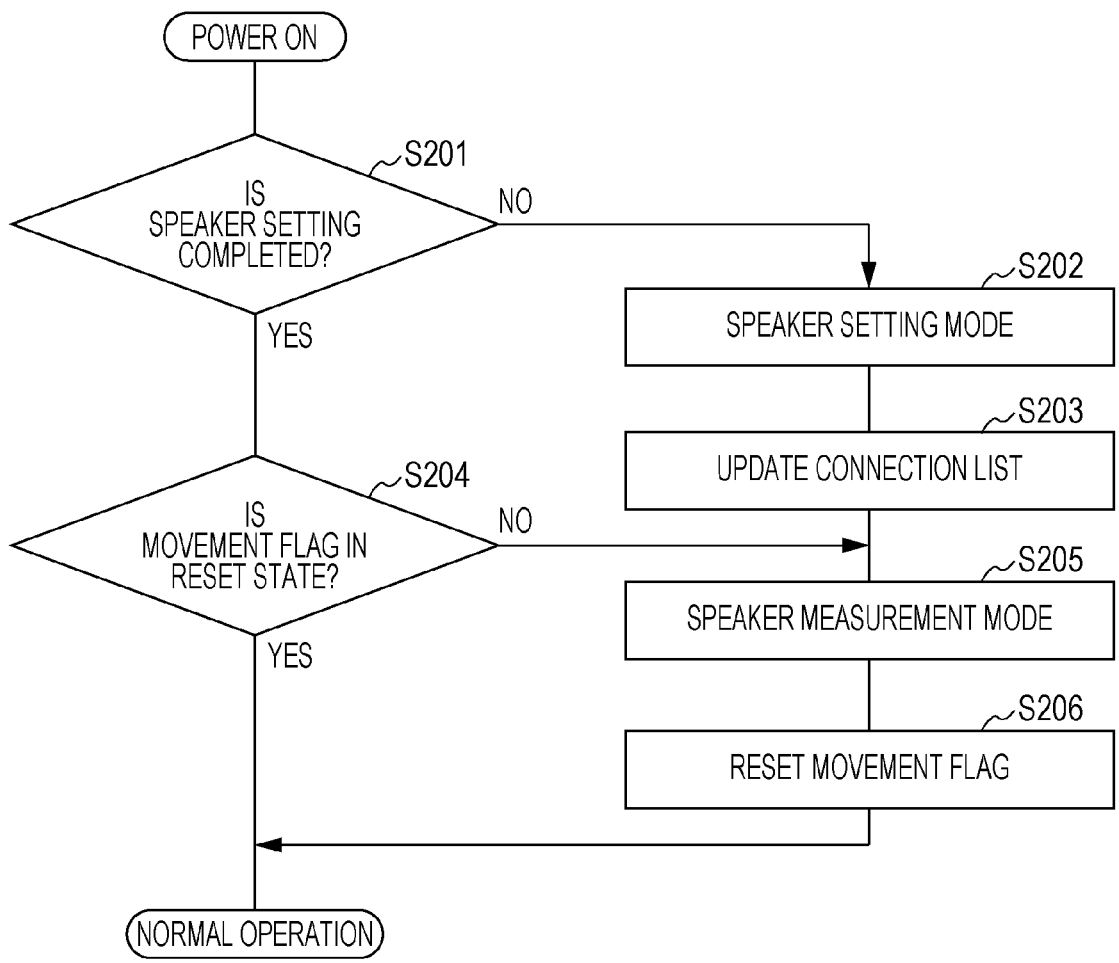
FIG. 7 is a flow chart illustrating a flow of processing in the sound system according to another embodiment of the present invention.

Next, the processing (operation) of the entire sound system 20 will be described with reference to FIG. 7. FIG. 7 is a flowchart illustrating a flow of the processing in the sound system 20 according to the present embodiment.

The power of the television 7 is ON by the user in a state where the reproduction apparatus 5, an antenna line, and the like are connected to the television 7.

When the power is ON, first, the control unit 708 included in the television 7 determines whether or not the configuration of the wireless speaker 8 that constitutes the sound system 20 in conjunction with the television 7 (pairing between the television 7 and the wireless speaker 8) is completed (step S201).

In a case where it is determined that the configuration of the wireless speaker 8 is not completed (NO in step S201), the control unit 708 executes a speaker configuration mode (step S202). Here, in the television 7, various configurations are not made immediately after purchase, and thus there is a need to perform various configurations at the time of initial starting. In such a case, the control unit 708 performs various configurations of the television 7, and after the various configurations are completed, executes the speaker configuration mode. The television can detect that the installation area is changed by receiving the broadcast wave, thereby recognizing that the installation area is significantly changed due to a move or the like. Even in such a case, it is assumed that various configurations are not made, and the television 7 executes the speaker configuration mode after the various configurations are completed.

When the speaker configuration mode is started, the control unit 708 executes the configuration of the wireless speaker 8 that is used in conjunction with the television 7. In general, in a wireless device, pairing is needed for the use in combination with other devices. Similarly, in the speaker configuration mode according to the present embodiment, the combination of the wireless speaker 8 and the television 7 is configured, and wireless connection is established. In the speaker configuration mode, the configuration of the combination can be executed by the operation of the television 7 and pressing a pairing button of the wireless speaker 8 (for example, selecting the pairing button in the configuration screen displayed on the display unit 708 of the television 7). In the speaker configuration mode, the plurality of wireless speakers 8 to be used in combination with the television 7 are registered in this way, and wireless connection is established.

When the wireless connection between the television 7 and the wireless speaker 8 is established and the speaker configuration mode is completed, the control unit 708 registers a connection list for managing the wireless speakers 8 in which the wireless communication is established as a list, and updates the connection list (step S203). The connection list may be stored in a storage unit (not illustrated) included in the television 7. Even in a case where a wireless speaker 8 is added later, the speaker configuration can be performed by executing the speaker configuration mode according to the same procedure and updating the connection list.

In a case where it is determined that the configuration of the wireless speaker 8 is completed (YES in step S201), the control unit 708 determines whether or not the movement flag is in a reset state (in the present embodiment, the value of the movement flag is "0") (step S204).

When it is determined that the movement flag is not in a reset state (the value of the movement flag is "1") (NO in step S204), or when the speaker configuration mode is completed and the connection list is updated, the television 7 executes a speaker measurement mode (step S205).

In the speaker measurement mode, the television 7 sequentially transmits the measurement audio signal to each of the plurality of wireless speakers 8 in which the wireless connection is established via the wireless communication unit 711, and outputs the measurement audio indicating the measurement audio signal from each wireless speaker 8. The television 7 measures the position of each wireless speaker 8, by receiving the sound of the measurement audio that is output from the wireless speaker 8 by the plurality of microphones 710 incorporated therein, and analyzing the measurement audio by the measurement unit 709. In the speaker measurement mode, the measurement processing is executed for all of the wireless speakers 8 in which the wireless connection is established (that is, all wireless speakers 8 registered in the connection list).

When the measurement is performed for all of the wireless speakers 8, the control unit 708 of the television 7 resets the movement flag corresponding to each of the wireless speakers 8 (sets the value of the movement flag to "1").

The control unit 708 notifies the audio processing unit 702 of the position information indicating the measured installation position of the speaker.

The audio processing unit 702 executes the adjustment processing on the signal to be output from each wireless speaker 8, such as adjustment of the delay time, adjustment of the frequency characteristics, addition, and the like, based on the position information of the speaker received from the control unit 708, and adjusts the reproduction balance of each wireless speaker 8. At this stage, the audio processing unit 702 can satisfactorily correct the influence of the wireless speaker 8 and the room, by generating a correction impulse response using the impulse response from each wireless speaker 8 of which the position is measured to the microphones 710, and inserting the correction impulse response into the signal to be transmitted to each wireless speaker.

In this way, it is possible to construct the sound system capable of providing a good sound field to the user.

(Processing According to Movement of Speaker)

The power of the television 7 is OFF by the operation of the operation unit 707 by the user. When the signal from the operation unit 707 is received, the control unit 708 issues an instruction of power-off to each unit of the television 7, and outputs an instruction for power-off to the wireless speaker 8 via the wireless communication unit 711. It is preferable that the wireless communication unit 711 is turned off after outputting the instruction for power-off to the wireless speaker 8.

When the instruction for power-off is received from the television 7 via the wireless communication unit 801, in the wireless speaker 8, the operation unit 805 transmits the instruction for power-off to the audio processing unit 802 and the amplification unit 803. When the audio processing unit 802 and the amplification unit 803 are in a power-off state or a power-saving state, the wireless speaker 8 transitions to a standby state with reduced power consumption. Thus, in external appearance, it seems that the wireless speaker 8 is in a state where the power is turned off. In the standby state, the control unit 806 transitions to a state of waiting for a signal from the wireless communication unit 801, the operation unit 805, and the sensor 808, and continues to monitor the signal.

During a period for which the wireless speaker 8 is in a standby state, when the wireless speaker 8 is moved by the user, the sensor 808 reacts to the movement and performs a notification to the control unit 806. When the notification is received, the control unit 806 sets the movement flag to "1". It is considered that the wireless speaker 8 is put away or moved for charging by the user.

Here, when the power of the television 7 is ON by the user, the control unit 708 of the television 7 performs processing of activating each unit of the television 7, and performs processing of requesting a response to the plurality of wireless speakers 8 via the wireless communication unit 711. When a command for requesting a response is received via the wireless communication unit 801, the control unit 806 of each wireless speaker 8 responds to the television 7 via the wireless communication unit 801, and wireless connection between the television 7 and the plurality of wireless speakers 8 is re-established.

Next, the control unit 708 of the television 7 checks the state of each wireless speaker based on the connection list that is held. In order to check the state of the wireless speaker 8, along with the response from the wireless speaker 8, the state information indicating whether each wireless speaker 8 can be activated, the information indicating where each wireless speaker 8 is moved, the movement the flag, and the like are acquired. The television 7 can acquire the number of the wireless speakers 8 that can be activated and the presence or absence of the movement of the wireless speakers 8 through the processing.

Here, when the movement of the wireless speaker 8 that can be activated is detected, the control unit 708 of the television 7 displays a message of "The movement of the speaker is detected. Start to perform measurement?" on the display unit 706 through the video processing unit 705, and requests the measurement of the position of the wireless speaker 8 to the user. In this state, the television 7 issues an activation instruction to the wireless speaker 8 that can be activated, and performs processing of making the television 7 and the wireless speaker 8 being in an operation state.

When a measurement instruction is issued by the operation of the operation unit 707 from the user, the sound system 20 enters the speaker measurement mode and performs the measurement. At this time, the position of only the wireless speaker 8 of which the position is moved may be measured. After the measurement is performed, the television 7 issues an instruction for resetting the movement flag (setting the value to "0") to the wireless speaker 8. Even when there is a wireless speaker 8 that exist in the connection list but cannot be activated, there is no need for the measurement because there is no change in the position of each wireless speaker 8, and thus it is possible to correspond to the change in the processing contents of the audio processing unit 702.

According to the processing described above, it is possible to maintain a good reproduction environment even when the wireless speaker 8 is moved in a state where the television 7 is turned off.

(Processing According to Movement of Speaker While Viewing Television)

Next, processing in a case where the wireless speaker 8 is moved by the user while viewing the television 7, and in a case where the wireless speaker 8 is moved in a state where the television is turned off and the measurement is not performed after the television is activated, will be described.

In a case where the wireless speaker 8 is moved by the user while viewing the television 7, and in a case where the wireless speaker 8 is moved in a state where the power of the sound system 20 is OFF and the measurement is not performed after the sound system is activated, in the wireless speaker 8, the movement flag remains set to "1". In this state, when the channel is switched by the operation of the television 7 from the viewer, when the input is switched, or when the broadcasting program that is viewing is changed, there is a case where the status on the audio signal is changed. For example, when a 2-ch broadcasting program is switched to a 5.1-ch broadcast program, when a 5.1-ch broadcast program is switched to a 22.2-ch broadcasting program, or when the input is switched to the reproduction apparatus 5 that outputs a 5.1-ch signal, the status on the audio channel is changed.

Here, in a case where the audio output mode in the television 7 is changed to a mode in which another speaker other than the speaker incorporated in the television 7 is used, when the wireless speaker 8 is moved, this affects the sound field, and thus it is preferable to measure the installation position of the wireless speaker 8 at the timing when the status on the audio signal is changed. The television 7 may display a message of requesting re-measurement from the user at the timing when the status on the audio signal is changed, and measure the installation position of the wireless speaker according to a user operation. In this way, the sound system 20 can request measurement at an appropriate timing by detecting the state change of the television 7 that displays an image.

As described above, the number of channels of the audio signal (2-ch, 5.1-ch, 7.1-ch, or 22.2-ch, or the like) can be determined by referring to an identifier representing the number of channels (for example, meta information or the like that is provided by a broadcast wave or from package media). The identifier may include, for example, any one of the number of channels of the audio indicated by the audio signal, an encoding method, and language setting. In a case where the sound apparatus is realized by the AV amplifier 1 according to the first embodiment, the identifier may be supplied, for example, from the television 6 connected to the AV amplifier 1 via a HDMI or the like.

Even when the wireless speaker 8 is moved, if the wireless speaker 8 is accurately returned at the position at which the measurement is performed, there is no need to perform re-measurement. In order to detect the position at which the measurement is performed, a detection device such as an individual identification holder, an individual identification tag, or the like may be installed in advance at the position at which the wireless speaker 8 is installed. In this case, the wireless speaker 8 is installed at the position at which the individual identification tag or the like is set, and the measurement of the position of the wireless speaker 8 is performed. Thus, it is possible to recognize that the wireless speaker 8 is returned at the measured position by the individual identification tag or the like.

Even after the control unit 708 detects a change in the installation position of the wireless speaker 8 (after the movement flag is set to "1"), when the change is detected by the detection device corresponding to the speaker of which the change is detected (that is, when the wireless speaker 8 is returned at the original position), the measurement unit 709 does not perform the measurement of the installation position of the wireless speaker 8.

In other words, in a case where it is possible to detect that the wireless speaker 8 is returned at the measured position, the sound system 20 can reset the movement flag from "1" to "0". Therefore, in the television 7, there is no need to perform unnecessary measurement, and thus it is possible to reduce the stress on the user more efficiently. Here, the detection device is a detection device that detects only the corresponding wireless speaker 8 when the wireless speaker 8 is installed at the position to be installed. The detection device may be, for example, a device using short-range wireless communication or a device using a bar code or the like. However, the detection device is not particularly limited, and may be a device having a structure that corresponds to the wireless speaker 8 one-to-one such a key. When the detection device having such a structure is used, it is possible to accurately restore the installation position of the wireless speaker.

In the present embodiment, the installation position of the wireless speaker 8 is acquired by measuring the position from the speed of the sound wave that propagates through a space between the wireless speaker 8 and the microphone 710. However, other methods may be used for the measurement, and the measurement method is not particularly limited. For example, a measurement method using ultrasonic waves may be used, or an optical measurement method using a camera may be used. Even in these cases, when the position of the wireless speaker 8 is changed during the measurement or after the measurement, the normal reproduction is difficult, and thus it is possible to exhibit the effect of reducing the number of the measurement. The measurement unit 709 may measure the installation position of the wireless speaker 8 by measuring the relative position between the microphone 710 and the wireless speaker 8.

In a case where it is detected that the television 7 is moved (the installation position is changed), the measurement unit 709 may measure the installation position of each of the plurality of wireless speakers 8, automatically or according to a user operation. In a case where the installation position of the television 7 is changed, it is considered that the user who uses the sound system 10 changes the position or the orientation of his or her own body when using the sound system 10. Thus, in a case where the television 7 is moved, the installation position of the wireless speaker 8 is measured again, and thus it is possible to provide a good audio reproduction environment to the user.

[Realization Example by Software]

Each block of the AV amplifier 1 (in particular, the control unit 105, the measurement unit 106, the audio processing unit 102), each block of the control unit of the television 7 (in particular, the control unit 708, the measurement unit 709, the audio processing unit 702), and each block of the wireless speaker 8 (in particular, the control unit 806, the audio processing unit 802) may be realized by logic circuits (hardware) formed using integrated circuits (IC chips) or the like, and may be realized by software using a central processing unit (CPU).

In the latter case, each block of the AV amplifier 1, the television 7, and the wireless speaker 8 includes a CPU that executes instructions of a program which is software for realizing each function, a read only memory (ROM) or a storage device (these are referred to as "recording medium") in which the program and various data are recorded to be readable by a computer (or CPU), a random access memory (RAM) that develops the program, and the like. The object of the present invention is achieved by reading the program from the recording medium and executing the program by the computer (or CPU). As the recording medium, "non-temporary tangible medium", for example, a tape, a disk, a card, a semiconductor memory, a programmable logic circuit, or the like can be used. The program may be supplied to the computer through any transmission medium that can transmit the program (a communication network, a broadcast wave, or the like). The present invention can be also realized in a form of a data signal in which the program is embedded in a carrier wave that is embodied by electronic transmission.

The present invention is not limited to each of the above-described embodiments, and can be freely modified in various ways within a scope described in the claims. In addition, an embodiment obtained by appropriately combining each technical means disclosed in different embodiments also falls within a technical scope of the present invention. Furthermore, by combining technical means disclosed in each embodiment, it is possible to form a new technical feature.

In order to solve the above-described problems, a sound apparatus according to an aspect of the present invention is a sound apparatus that supplies an audio signal to each of a plurality of speakers, including: a detection unit that detects a change in the installation position of at least one speaker; a measurement unit that measures the installation position of at least the speaker of which the installation position is changed among the plurality of speakers, automatically or according to a user operation, after the change is detected by the detection unit; and an adjustment unit that adjusts the audio signal based on the measurement result of the measurement unit.

According to the configuration, in a case where the change in the installation position of the speaker is detected by the detection unit, the sound apparatus measures the installation position of the speaker by the measurement unit. Accordingly, the sound apparatus can prevent the measurement of the position of the speaker from not being performed in a case where the position of the speaker is changed. On the other hand, in a case where the installation position of the speaker is not changed, the measurement of the position of the speaker is not performed.

Therefore, the sound apparatus can prevent the measurement of the position of a speaker from not being performed in a case where the position of the speaker is changed, and prevent the measurement of the position of the speaker from being performed more than necessary.

In the sound apparatus according to the aspect of the present invention, preferably, the speaker is configured to detect the presence or absence of the movement of own device during a period for which the sound apparatus is not activated, and the detection unit is configured to check the presence or absence of the movement so as to detect the change in the installation position of the speaker when the sound apparatus is activated.

According to the configuration, when the sound apparatus is activated, the sound apparatus can check the presence or absence of the change in the position of the speaker during a period for which the sound apparatus is not activated, and thus it is possible to further enhance user convenience.

In the sound apparatus according to the aspect of the present invention, preferably, after the change is detected by the detection unit, in a case where the number of channels of the audio signal that is supplied by the sound apparatus is changed, the measurement unit measures the installation position of each of the plurality of speakers, automatically or according to a user operation.

According to the configuration, in a case where the position of the speaker is changed, when the number of channels of the audio signal, the sound apparatus can measure the position of the speaker.

In the sound apparatus according to the aspect of the present invention, preferably, when each of the plurality of speakers is installed at the position to be installed, a detection device that detects only the corresponding speaker is installed, and even after the change is detected by the detection unit, when the change is detected by the detection device corresponding to the speaker of which the change is detected, the measurement unit does not perform the measurement of the installation position.

According to the configuration, even in a case where the position of the speaker is changed, when measuring the position of the speaker, in a case where each speaker is installed at the position to be installed, the sound apparatus does not perform the measurement. Accordingly, in a case where there is no need to measure the position of the speaker, it is possible to prevent the measurement of the position of the speaker from being performed more efficiently.

In the sound apparatus according to the aspect of the present invention, preferably, the measurement unit is configured to measure the installation position of each of the plurality of speakers, automatically or according to a user operation, after the movement of the sound apparatus is detected.

According to the configuration, the sound apparatus can efficiently measure the position of the speaker.

A television receiver according to an aspect of the present invention is a television receiver including each unit that is included in the sound apparatus. In the television receiver, preferably, the measurement unit is configured to refer to data that is generated by a specific device so as to measure the installation position of the speaker, and the specific device is incorporated.

According to the configuration, the television receiver can exhibit the same effect as that of the sound apparatus.

A speaker device according to an aspect of the present invention is a speaker device that outputs the audio indicated by an audio signal when the audio signal is supplied from the sound apparatus. Preferably, the speaker device includes an output unit that outputs information for causing the sound apparatus to detect a change in the position of the speaker device, toward the sound apparatus, in a case where the position of the speaker device is changed.

According to the configuration, the speaker device outputs the information to the sound apparatus in a case where the position of the speaker device is changed. Accordingly, the speaker device can cause the sound apparatus to detect that the position of the speaker device is changed. Thus, it is possible to prevent the measurement of the position of the speaker from not being performed in a case where the position of the speaker in the sound apparatus is changed, and prevent the measurement of the position of the speaker from being performed more than necessary in the sound apparatus.

The speaker device according to the aspect of the present invention, preferably, further includes a detection unit that detects the movement of the speaker device in a case where the speaker device is moved. In the speaker device, preferably, the output unit outputs information indicating that the speaker device is moved, as the information, in a case where the movement of the speaker device is detected by the detection unit.

According to the configuration, the speaker device can detect that the speaker is moved, by the detection unit. Accordingly, in a case where the movement of the speaker device is detected by the detection unit, the speaker device can output the information to the sound apparatus.

Preferably, the speaker device according to the aspect of the present invention is configured to be in a standby state during a period for which the sound apparatus is not activated, and the detection unit is configured to detect the movement of the speaker device in a case where the speaker device is moved during the period of the standby state.

According to the configuration, even in a standby state, the speaker device can detect that the speaker device is moved. Accordingly, the speaker device can prevent the measurement of the position of the speaker device from not being performed by the sound apparatus, in a case where the speaker device is moved during the period for which the sound apparatus is not activated.

An audio signal adjustment method according to an aspect of the present invention is an audio signal adjustment method performed by a sound apparatus that supplies an audio signal to each of a plurality of speakers. The audio signal adjustment method includes: a detection step for detecting a change in the installation position of at least one speaker; a measurement step for measuring the installation position of each of the plurality of speakers, automatically or according to a user operation, after the change is detected by the detection step; and an adjustment step for adjusting the audio signal based on the measurement result in the measurement step.

According to the configuration, the audio signal adjustment method can exhibit the same effect as that of the sound apparatus.

The sound apparatus according to each aspect of the present invention may be realized by a computer. In this case, a program of the sound apparatus that realizes the sound apparatus using the computer by causing the computer to operate as each unit included in the sound apparatus, and a computer-readable recording medium in which the program is recorded are also included in the scope of the present invention.

INDUSTRIAL APPLICABILITY

The present invention can be preferably used for a sound apparatus such as an AV amplifier, a television receiver, and the like that supplies an audio signal to a plurality of speakers.

REFERENCE SIGNS LIST

1 AV AMPLIFIER (SOUND APPARATUS)
2 SPEAKER (SPEAKER DEVICE)
3 MICROPHONE
5 REPRODUCTION APPARATUS
6, 7 TELEVISION (SOUND APPARATUS, TELEVISION RECEIVER)
8 WIRELESS SPEAKER (SPEAKER DEVICE)
10, 20 SOUND SYSTEM
102 AUDIO PROCESSING UNIT (ADJUSTMENT UNIT)
105 CONTROL UNIT (DETECTION UNIT)
106 MEASUREMENT UNIT (MEASUREMENT UNIT STAGE)
202 SENSOR
702 AUDIO PROCESSING UNIT (ADJUSTMENT UNIT)
703 AMPLIFICATION UNIT
704 SPEAKER
708 CONTROL UNIT (DETECTION UNIT)
709 MEASUREMENT UNIT (MEASUREMENT UNIT)
710 MICROPHONE
802 AUDIO PROCESSING UNIT
804 SPEAKER
805 OPERATION UNIT
806 CONTROL UNIT
808 SENSOR

The invention claimed is:

1. A sound apparatus that supplies an audio signal to each of a plurality of speakers, the sound apparatus comprising:
a measurement circuitry that measures the position of each of the plurality of speakers automatically or according to a user operation, in a case where a number of channels of the audio signal that is supplied by the sound apparatus is changed; and
an adjustment circuitry that adjusts the audio signal based on the measurement result of the measurement circuitry.

2. The sound apparatus according to claim 1,
wherein the sound apparatus comprises a detection circuitry that detects a change in a position of at least one speaker of the plurality of speakers, and
wherein the detection circuitry checks, when the sound apparatus is activated, the presence or absence of the change in the position, detected by the speaker during a period for which the sound apparatus is not activated, in the position of the speaker so as to detect the change in the position of the speaker.

3. The sound apparatus according to claim 1,
wherein the sound apparatus comprises a detection circuitry that detects a change in a position of at least one speaker of the plurality of speakers, and
wherein, in a case where (i) the change in the position is detected by the detection circuitry and (ii) the number of channels of the audio signal that is supplied by the sound apparatus is changed, the measurement circuitry measures the position of each of the plurality of speakers, automatically or according to a user operation.

4. The sound apparatus according to claim 1,
wherein the sound apparatus comprises a detection circuitry that detects a change in a position of at least one speaker of the plurality of speakers,
wherein a detection device that detects only the at least one speaker is located at an installation location when each of the plurality of speakers is located at a predetermined installation location, and
wherein, even after the change in the position is detected by the detection circuitry, when the change in the position is detected by the detection device corresponding to the at least one speaker of which the change in the position is detected, the measurement circuitry does not perform the measurement of the position.

5. The sound apparatus according to claim 1,
wherein the measurement circuitry is configured to measure the position of each of the plurality of speakers, automatically or according to a user operation, after the change in the position of the sound apparatus is detected.

6. A television receiver that includes each circuitry included in the sound apparatus according to claim 1,
   wherein the measurement circuitry is configured to refer to data that is generated by a specific device so as to measure the position of the speaker, and
   wherein the specific device is incorporated.

7. A computer-readable non-transitory recording medium in which a program causing a computer to function as the sound apparatus according to claim 1 is recorded.

8. A speaker device that outputs audio indicated by an audio signal when the audio signal is supplied from a sound apparatus, the speaker device comprising:
   an output circuitry that outputs information for causing the sound apparatus to detect a change in a position of the speaker device, toward the sound apparatus, in a case where the position of the speaker device is changed; and
   a detection circuitry that detects the change in the position, wherein
   the output circuitry outputs information indicating the change in the position of the speaker in a case where the change in the position of the speaker is detected by the detection circuitry, as the information,
   the speaker device is in a standby state during a period for which the sound apparatus is not activated, and
   the detection circuitry detects the change in the position of the speaker device in a case where the position of the speaker device is changed during the period of the standby state.

9. A sound apparatus that supplies an audio signal to each of a plurality of speakers, the sound apparatus comprising:
   a detection circuitry that detects a change in a position of at least one speaker of the plurality of speakers;
   a measurement circuitry that measures the position of the at least one speaker of which the position is changed, automatically or according to a user operation, after the change in the position is detected by the detection circuitry; and
   an adjustment circuitry that adjusts the audio signal based on the measurement result of the measurement circuitry, wherein
   the detection circuitry checks, when the sound apparatus is activated, the presence or absence of the change in the position, detected by the speaker during a period for which the sound apparatus is not activated, in the position of the speaker so as to detect the change in the position of the speaker.

10. A sound apparatus that supplies an audio signal to each of a plurality of speakers, the sound apparatus comprising:
    a detection circuitry that detects a change in a position of at least one speaker of the plurality of speakers;
    a measurement circuitry that measures the position of the at least one speaker of which the position is changed, automatically or according to a user operation, after the change in the position is detected by the detection circuitry; and
    an adjustment circuitry that adjusts the audio signal based on the measurement result of the measurement circuitry; wherein
    a detection device that detects only the at least one speaker is located at an installation location when each of the plurality of speakers is located at a predetermined installation location, and
    even after the change in the position is detected by the detection circuitry, when the change in the position is detected by the detection device corresponding to the speaker of which the change in the position is detected, the measurement circuitry does not perform the measurement of the position.

* * * * *